Figure 1:
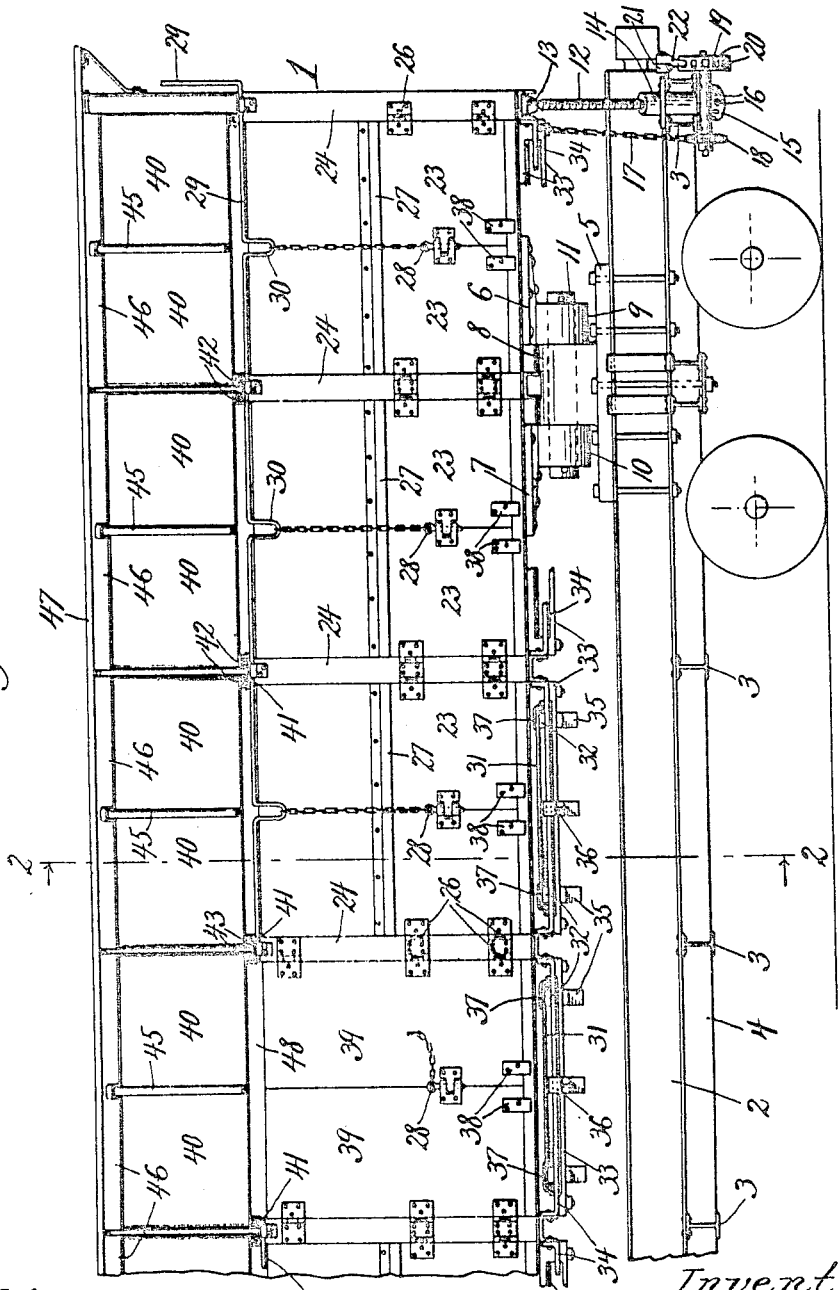

C. W. JACKSON.
VEHICLE.
APPLICATION FILED APR. 21, 1910.

1,108,992.

Patented Sept. 1, 1914.
3 SHEETS—SHEET 1.

Witnesses,
Edward T. Wray.
Edna K. Reynolds

Inventor.
Charles W. Jackson
by Parker & Carter
Attorneys.

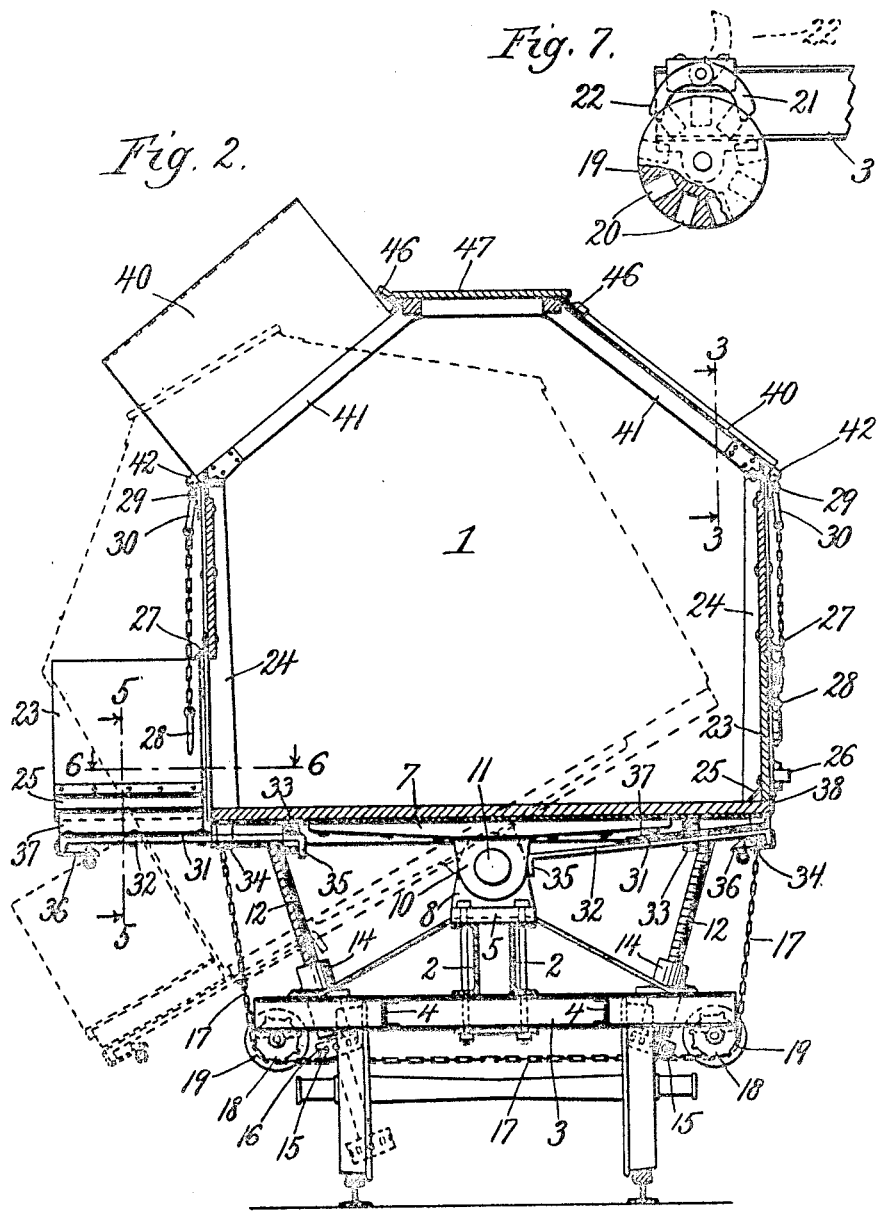

C. W. JACKSON
VEHICLE.
APPLICATION FILED APR. 21, 1910.
1,108,992.
Patented Sept. 1, 1914.
3 SHEETS—SHEET 3.
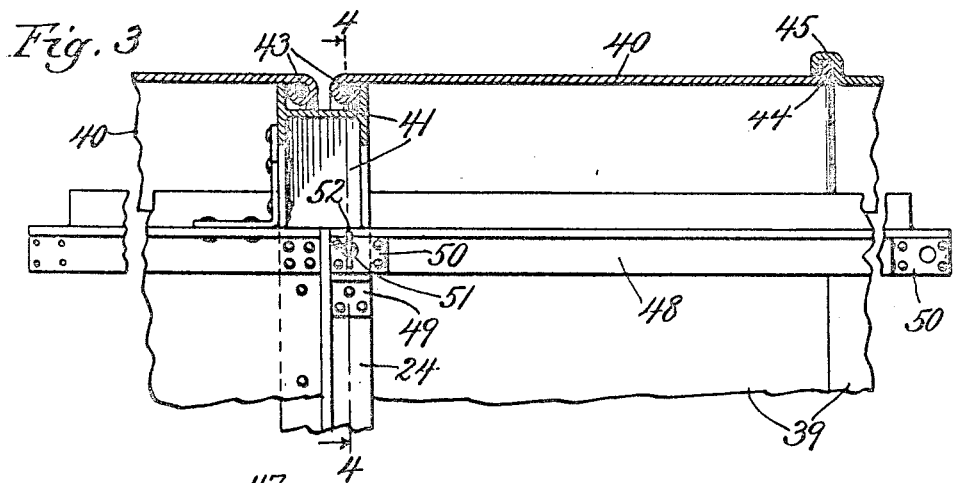
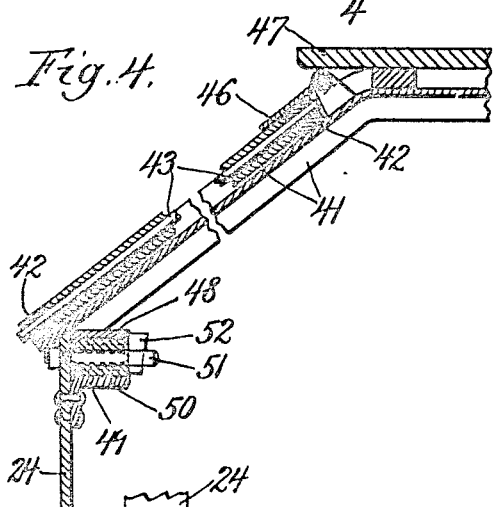
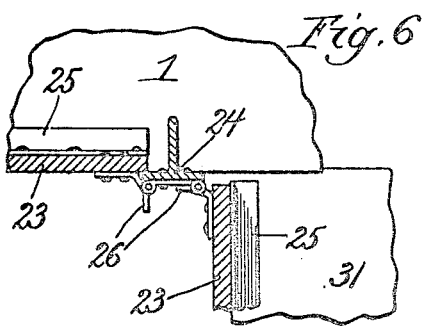
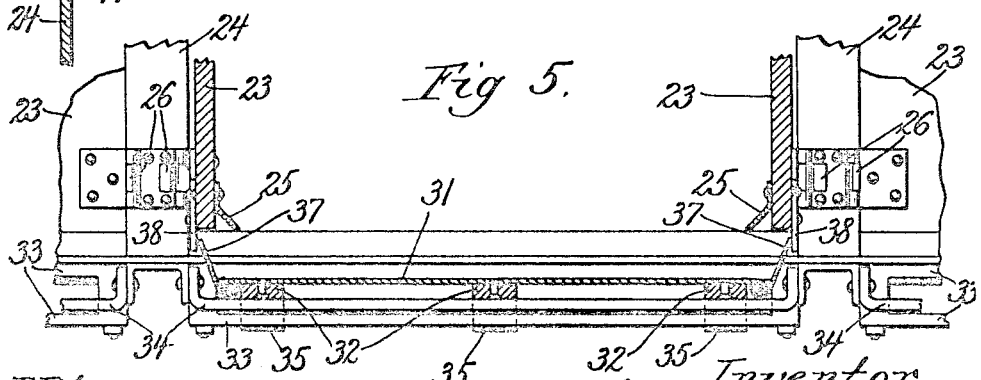
Witnesses.
Edward T. Wray.
Edna K. Reynolds.
Inventor.
Charles W. Jackson
by Parker & Carter
Attorneys.

UNITED STATES PATENT OFFICE.

CHARLES W. JACKSON, OF CHICAGO, ILLINOIS.

VEHICLE.

1,108,992.   Specification of Letters Patent.   Patented Sept. 1, 1914.

Application filed April 21, 1910. Serial No. 556,838.

*To all whom it may concern:*

Be it known that I, CHARLES W. JACKSON, a citizen of the United States, residing at Chicago, in the county of Cook and State of Illinois, have invented a certain new and useful Improvement in Vehicles, of which the following is a specification.

This invention relates to improvements in vehicles and has for its object to provide a new and improved device of this description.

The invention is illustrated in the accompanying drawings, wherein—

Figure 1 is a side view of one end of a vehicle embodying the invention; Fig. 2 is a sectional view taken on the line 2—2 of Fig. 1; Fig. 3 is a sectional view taken on line 3—3 of Fig. 2; Fig. 4 is a sectional view taken on line 4—4 of Fig. 3; Fig. 5 is a sectional view taken on line 5—5 of Fig. 2; Fig. 6 is a sectional view taken on line 6—6 of Fig. 2; Fig. 7 is a detail view with parts broken away showing one of the wheels where power is applied to move the vehicle body.

Like numerals refer to like parts throughout the several figures.

One of the objects of the present invention is to provide a vehicle, such as a railway car, wagon or the like, so constructed and arranged that the material may be easily and quickly removed therefrom and the cost and trouble of handling such material decreased.

For purposes of illustration I have shown the invention as applied to a vehicle.

Referring now to the particular construction illustrated, the vehicle is provided with a body 1 which is movably mounted upon a suitable frame or running gear of any desired construction. As herein shown this frame consists of the longitudinal beams 2 and cross beams 3. These cross beams are preferably connected together by channel irons or connecting pieces 4. These beams are all suitably fastened together. The body 1 is mounted upon the frame in any desired manner so that it may be rocked to either side when it is desired to quickly unload the material in the body. As herein shown the movable connection between the frame and the body is made near each end of the body by means of the plates 5, 6, and 7 provided with projections 8, 9 and 10. The plate 5 is connected with the frame and the plates 6 and 7 with the body, and the projection 8 is between the projections 9 and 10. The parts may be held in proper relation by means of a pin or rod 11 passing through all of said projections. The body may be connected at any desired number of points with the frame, and it will be seen that by means of this apparatus the body can be rocked to one side or the other as desired. The frame is mounted upon wheels in any of the ordinary ways. Means are provided for preventing the rocking or tilting of the body while the vehicle is being moved from place to place and any desired apparatus for this purpose may be used. As herein shown I provide at each corner of the body a screw-threaded rod 12 which is rotatably connected with a shoe 13 engaging the body of the vehicle. The connection between the screw and the shoe is preferably a universal connection so as to permit the shoe to properly engage the body in all its various positions. The rods 12 pass through stationary threaded parts 14 fixed to the frame and are provided with heads 15 having holes 16 into which bars may be inserted for the purpose of rotating the rods. It will be seen that by rotating the rods at one side of the vehicle so as to lower the shoes, the body of the vehicle is free to be moved to its dumping position. The rods 12 form strong, positive supports for the sides of the vehicle which firmly and securely hold the body in an upright position.

Connected with the body at one or both ends of the vehicle, is a chain or other flexible device 17, the ends thereof being connected to the body at opposite sides as shown in Fig. 2. This chain passes over sprocket wheels 18. Some means is provided for moving these sprocket wheels to tilt the body. As herein shown the sprocket wheels are connected with shafts to which are connected the actuating wheels 19 having holes 20 at their periphery, into which may be inserted the bar by which the wheel is rotated. (See Figs. 1 and 7.) These actuating wheels are provided with pawls 21, 22, the ends of which fit into the holes 20 and which, when in place, prevent the rotation of these wheels in either direction. When it is desired to rotate the actuating wheels the pawl which prevents its rotation in the desired direction is moved up out of the way, as shown in Fig. 7, so as to become disengaged from the wheel. One pawl associated with each wheel would have to be moved out of engagement when it is desired to move the body of the vehicle to its dumping position.

The vehicle may be one with an open body or one having an entirely closed body. For the purpose of more clearly illustrating my invention I have shown a vehicle with an entirely closed body. At the sides of the body I prefer to provide a series of doors 23. When an open body is used these doors may be run to the top thereof. When a closed body is used they may run part-way up the side as shown, for example, in Figs. 1 and 2. These doors are hinged to the vertical frame pieces 24 (see Fig. 6), and are preferably provided at the bottom with a projecting lip 25, which protects the crack at the bottom of the doors, when the doors are closed. The hinges of the doors are preferably provided with projections 26 which engage the frame pieces 24 when the door is open so as to limit the opening movement. I prefer to provide at the top of the doors water-shedding portions 27 (see Figs. 1 and 2) which prevent water from entering the cracks at the tops of the doors. The doors may be locked together so as to be locked in their closed position in any desired manner. As herein shown they are provided with locking parts which are locked together by means of pins 28. In order that a number of doors may be opened simultaneously I may provide a rock shaft 29 arranged with cranks 30 which are connected with the pins 28 so that when the lever 29 is moved to rock the shaft all the pins will be moved out so as to unlock the doors. There is preferably associated with each door or pair of doors, a movable platform which may be moved out so as to receive the material when the doors are open. These platforms 31 may be arranged in any desired manner and are preferably each independent of the other. As herein shown they each consist of a floor carried by the supports 32 and are movably mounted upon brackets 33, 34 so that they may be slid inwardly, as shown on the right hand of Fig. 2, so as to be out of the way when not in use and may be slid outwardly into their operative position as shown on the left hand of Fig. 2, when desired. The bracket 33 is preferably arranged so that the bottom of the opening therethrough is lower than the bottom of the opening in the bracket 34 so as to permit the platform to be held at an inclined position as shown in Fig. 2. The outward movement of the platforms is limited by limiting parts 35 which engage the brackets 33 and are held in their inoperative positions by means of the spring latches 36 which engage the brackets 34. These latches will automatically move to permit the platforms to be moved inwardly but must be sprung out to permit the platforms to be moved into their operative position. These platforms are preferably provided with pivoted sides 37 (see Fig. 5) which may be moved out to engage the projections 38 on the doors when the doors are opened to prevent material from escaping between the doors and the platform. When the body of the vehicle is entirely inclosed it is desirable to have a pair of large doors so that the vehicles may be loaded or unloaded when material in large pieces is being shipped. As herein shown there is provided near the middle of the body portion the large doors 39 which are similar to the doors 23. There may also be provided at the roof a series of doors 40. These doors, as shown, are double doors and are arranged so as to prevent leakage into the vehicle. As herein shown the roof doors 40 are hinged to the roof beams 41. These beams are shown as I-beams and are provided with hinged lugs 42 through which pass the rods 43 which are connected with the doors. It will thus be seen that there can be no leakage at the hinge of the doors.

The meeting part of the doors are provided with interlocking and protecting parts which prevent leaks. As herein shown one door is provided with a projection 44 and the other with a channel 45 into which the projection 44 fits, the channel entirely covering the edge of the door so as to prevent leakage. At the tops of the doors are a series of pivoted flaps 46 (see Figs. 1 and 4) which prevent leakage at the upper ends of the doors. The top 47 projects beyond these flaps as shown in Fig. 4. In the event it is desirable to have a larger opening for loading and unloading the vehicle the beam or frame piece 48 at the top of the large doors 39 may be made removable so that it may be removed and the doors 39 and the roof doors 40 opened to form a large loading and unloading opening. As shown in Figs. 3 and 4 this frame piece or beam 48 extends only between the frame pieces 24 at the sides of the doors 39. Attached to the frame pieces 24 are the angle pieces or shelves 49 upon which rest the ends of the beam 48. This beam at the end may be provided with the fillers 50 which rest upon the shelves 49. The beam is held in place at each end by the bolts 51 having keys 52 as shown in Fig. 4. When it is desired to remove the beam 48 the keys 52 are removed, whereupon the beam 48 may be slid out so as to be disengaged from the bolts and then be removed. The side doors may be constructed like the roof doors 40, with the waterproof hinge and interlocking edges, if desired.

The use and operation of my invention are as follows: When it is desired to move the material from one point to another, the body of the vehicle is kept in its upright position as shown in full lines in Fig. 2 by means of the rods 12 and the doors are properly closed. If now it is desired to unload only a part of the material, when the vehicle contains such material as coal, sand or the like, one or more platforms 31 are pulled out and the doors associated therewith opened so as to permit the material to flow out onto the platform. These platforms are preferably of such a length as to permit the material to reach the angle of rest without flowing from the platform. The material can then be easily unloaded by means of a shovel or the like, the operator working on the platform. If it is desired to entirely unload the vehicle the rods 12 at one side are screwed down the desired amount, the pins 28 are moved from the doors 23 and the body tilted as shown, for example, in dotted lines in Fig. 2, by means of the controlling mechanism, that is, by applying the rod to one of the wheels 19 and rotating it sufficiently. It will thus be seen that the material will be at once discharged through the door openings. If it is desired to discharge the material into a receptacle at a distance from the vehicle the platform 31 may be moved out before the body is moved to its dumping position. After the vehicle has been unloaded the body may be moved back to its upright position by means of the controlling mechanism and the rods 12 moved so as to hold it in its position. It will be noted that the body may be gradually tilted to its unloading position by simply screwing down rods 12 on one side of the axis about which the body moves, the body under these conditions being held and firmly supported by said rods in all its various positions. The body can then be moved back to its upright position by screwing up said rods. It will thus be seen that there is here provided a vehicle which can be easily and quickly loaded and unloaded and which may be used to carry any desired material and which may be easily manipulated to unload the material. It will also be seen that the material is discharged at one side and its discharge may thus be completely controlled.

In view of the fact that the body portion is connected to the frame by pivotal connection, it will be seen that the body portion cannot remain in a balanced position but the weight thereof will be resting upon the supports at one side or the other of the central pivotal connection. If for example, the vehicle is supported upon an inclined surface, the weight of the body portion will be on the supports on the down-hill side. If it is desired to dump the body in the down-hill direction, it is only necessary to lower these supports. If however it is desired to dump the body on the up-hill side, some suitable means must be provided for transferring the weights of the body portion to the supports on the up-hill side. Any suitable means for this purpose may be used. As herein shown, this may be done by means of the flexible device 17.

I claim:

1. A vehicle for transporting material from one point to another, comprising a frame, a body having a central, longitudinal, pivotal, rocking connection with said frame, movable rigid supports on each side of said central pivotal connection for holding said body in an upright position, devices for preventing said supports from being moved laterally, means for moving said supports longitudinally, the supports for the sides of said body adapted to engage and support said body while it is being moved to its unloading position on either side respectively, and a series of discharge doors at the sides of the body through which the material in the body is automatically discharged when the body is moved about said rocking connection.

2. A vehicle for transporting material from one point to another comprising a frame, a body having a central, longitudinal, pivotal rocking connection with said frame, rigid, adjustable supports on each side of said pivotal connection for holding said body in all its various positions while being moved about said central rocking connection, means for moving said supports longitudinally and for preventing the movement thereof laterally, a series of discharge doors at the side of said body through which the material in the body is automatically discharged when the body is moved about said rocking connection, and a series of sliding platforms associated with said doors and adapted to be slid back and forth at the bottom thereof.

3. A vehicle for transporting material comprising a frame, a body portion having a longitudinal central rocking connection with said frame so as to rock about a longitudinal axis, rigid adjustable supports for said body portion, located on each side of said central rocking connection, said supports located below the body, means for moving said supports in the direction of their length and for preventing the movement thereof laterally while the longitudinal movement is taking place, the supports on one side adapted to engage and support the body portion and when operated gradually lower it while it is moving about said longitudinal axis to its discharged position.

4. A vehicle for transporting material from one point to another comprising a frame, a body movably connected to said frame by a central, longitudinal, pivotal connection, and adapted to be tilted about its connection with the frame toward either side of said longitudinal, pivotal connection, and adjustable screw threaded rods supporting the bottom of said body and adapted to be moved longitudinally, means for preventing lateral movement of said rods and adapted to engage the body so as to hold said body in any of its tilted positions and to prevent its movement about its connection with the frame.

5. A vehicle for transporting material comprising a frame, a body pivotally connected to said frame near its middle so as to move about a longitudinal axis, screw threaded rods on each side of said pivotal connection of the body to the frame, and adapted to engage said body, the screw-threaded rods on each side of the body adapted to be screwed down so as to gradually lower the body to its discharge position.

6. A vehicle for transporting material comprising a frame, a body portion on said frame and having a longitudinal central rocking connection therewith, screw-threaded rods on each side of said rocking connection, threaded parts on the frame which engage said screw-threaded rods, the ends of said rods adapted to engage said body when the body is in its upright position, means for independently screwing down the screw-threaded rods on either side of said body so as to gradually lower the body to its discharge position, and means for screwing up said rods so as to gradually move the body to its upright position.

7. A vehicle for transporting material comprising a frame, a body portion having a longitudinal central rocking connection with said frame so as to rock about a longitudinal axis, rigid adjustable supports for said body portion at each side of said central rocking connection, said supports located below the body, means for moving said supports in the direction of their length and for preventing the movement thereof laterally while the longitudinal movement is taking place, the supports on one side adapted to engage and support the body portion while it is moving about said longitudinal axis to its discharging position and means for transferring the weight of said body portion to the supports on the up-hill side of the vehicle when said vehicle is supported on an inclined surface.

Signed at Chicago, Illinois, this 11th day of April, 1910.

CHARLES W. JACKSON.

Witnesses:
EDNA K. REYNOLDS,
DONALD M. CARTER.

Copies of this patent may be obtained for five cents each, by addressing the "Commissioner of Patents, Washington, D. C."